United States Patent [19]

Adomeit

[11] 4,350,313
[45] Sep. 21, 1982

[54] BELT WIND-UP ROLLER FOR VEHICLE-SAFETY BELTS WITH BLOCKING DEVICE

[75] Inventor: Heinz D. Adomeit, Berlin, Fed. Rep. of Germany

[73] Assignee: Repa Feinstanzwerk GmbH, Alfdorf, Fed. Rep. of Germany

[21] Appl. No.: 231,665

[22] Filed: Feb. 5, 1981

Related U.S. Application Data

[63] Continuation of Ser. No. 95,928, Nov. 20, 1979, abandoned, which is a continuation-in-part of Ser. No. 865,856, Dec. 30, 1977, abandoned.

[30] Foreign Application Priority Data

Oct. 13, 1976 [DE] Fed. Rep. of Germany ....... 2646238

[51] Int. Cl.³ .................... A62B 35/02; B65H 75/48
[52] U.S. Cl. ........................................... 242/107.4 C
[58] Field of Search ............... 242/107.4 C, 107.4 R, 242/107.4 A, 107.4 B, 107.4 D, 107.4 E; 280/806–808; 297/475–480

[56] References Cited

U.S. PATENT DOCUMENTS

| | | | |
|---|---|---|---|
| 3,074,761 | 1/1963 | Ryan | 242/107.4 C X |
| 3,138,405 | 6/1964 | Hanway | 242/107.4 C X |
| 3,467,337 | 9/1969 | Putman | 242/107.4 C X |
| 3,695,545 | 10/1972 | Peters | 242/107.4 C X |
| 3,851,837 | 12/1974 | Griffin | 242/107.4 C X |

Primary Examiner—John M. Jillions
Attorney, Agent, or Firm—Herbert L. Lerner

[57] ABSTRACT

Belt wind-up roller for vehicle safety belts having a wind-up roller in a housing in which the locking part at the belt wind-up roller and the counter-locking part at the housing are arranged in such manner that the blocking is effected at the belt withdrawal side of the belt wind-up roller, in an angular zone of approximately 120°, beginning approximately 10° from before the roll-off point of the belt in the roll-off direction, to remove the load of the force-transfer between the axis of the belt wind-up roller and the housing.

5 Claims, 9 Drawing Figures

BELT WIND-UP ROLLER FOR VEHICLE-SAFETY BELTS WITH BLOCKING DEVICE

This is a continuation of application Ser. No. 095,928, filed Nov. 20, 1979, now abandoned, which, in turn, is a continuation-in-part of application Ser. No. 865,856, filed Dec. 30, 1977, now abandoned.

The invention relates to a belt wind-up roller for vehicle-safety belts and, more particularly, such a wind-up roller with a rotary shaft for winding a withdrawable belt thereon, as well as a device for blocking further withdrawal of the belt, with at least one blocking member which, when applying an abrupt pull or tension to the belt, is displaceable into a blocking position in contact with a counter-support member fixed to a housing.

Belt wind-up rollers for vehicle safety belts are known in which the body of the wind-up roller is slidably supported against the force of a spring in such manner, that free rotation, i.e. free withdrawal of the safety belt is possible during normal operation, while at a sudden acceleration of the withdrawal motion, the axis is displaced sideways so that a locking member arranged at the belt wind-up roller engages a counter-locking member on the housing, preventing any further rotation of the belt wind-up roller, and thereby further withdrawal of the safety belt.

The disadvantage in known constructions is that considerable side forces act on the axes of the belt wind-up roller when blocking which must be absorbed over the axis and the associated guide members at the housing. This again requires that the axis and the bearings to be relatively massively dimensioned, which again results in disadvantages with respect to size, and the mass which is to be moved, and thereby reduces the response sensitivity.

A belt wind-up roller wherein the blocking device is shown as a locking member having a locking gear with teeth has become known heretofore from the German Published Non-Prosecuted Application DT-OS No. 24 35 050. To put on or apply the belt or web, it can be withdrawn from the winding roller against the action of a wind-up spring, the latter exerting tension on the belt so that it lies tightly against the body of the user or wearer. During an accident, the shaft of the conventional wind-up rollers is locked so that the belt cannot be withdrawn at that instant.

Locking mechanisms have also become known heretofore which act in dependency upon the deceleration. Keying member or sensors, such as a pendulum, a ball or another inertial body, are shifted in such known devices upon occurrence of a sharp deceleration of the vehicle and produce a locking of the shaft.

Belt wind-up rollers are also known which lock both due to vehicle deceleration as well as the speed of the belt web withdrawal if, namely, the belt web is abruptly withdrawn from the winding roller.

In the belt wind-up device according to the hereinaforementioned German published application, rapid locking or latching is produced. In that known device, a ring-shaped inertial body with a journal and engagement means for a spring mounted on a face thereof is provided. The winding roller is couplable through the spring which is additionally disposed in a cylindrical member fastened to the winding roller, the locking member being disposed between the inertial body and the winding roller in a manner that, during high winding speed of the winding roller, the locking member is movable, due to twisting of the inertial member relative to the winding roller, into a locking position wherein the teeth of the locking member engage in the teeth of the counter-support member.

In all of these heretofore known belt wind-up rollers, the difficulty always exists of providing a locking opposing force for the belt withdrawal force through the locking member and the winding roller fixed against axial displacement in the housing. During normal operation, the winding roller must be able to be rotated without any trouble, the opposing force from the housing of the belt wind-up roller fastened to the vehicle chassis being absorbed by the counter-support member. The blocking forces are generally large forces that are to be absorbed by a coupling member between the housing or the counter-support member fixed to the housing and the winding roller. These locking members must therefore have a sturdy construction and bearing support. Production costs for the heretofore known belt wind-up rollers frequently depend upon how economically the locking member and the bearing therefor i.e. the coupling members, can be constructed. For rapid or high-speed locking, it is futhermore desired that rapid engagement take place between the coupling locking member and the counter-support member fixed to the housing.

In the heretofore known belt wind-up roller according to the hereinaforementioned German published application, the shaft of the winding roller has a disc on an end side thereof, has the cylindrical member with the slot in the front and center of the free end of the disc, and has two pins diametrically spaced from the cylindrical member. Two locking members having a somewhat semicircular construction and teeth at the outer periphery thereof are rotatably seated on these pins and are formed with two recesses or cutouts into which the two hereinaforementioned journals, which are mounted likewise diametrically to the ring-shaped inertial member, project. A leaf spring is inserted into a pair of oppositely disposed slots formed in the inertial body, the leaf spring being inserted in the middle part into the cylindrical member provided with the slot. During abrupt withdrawal of the belt web out of the wind-up roller, the inertial body lags behind with respect to the sharply accelerated winding roller, and causes the locking member to rotate about the pins in such a sense that the teeth of the locking member engage in those of the counter-support member. Locking contact is thereby achieved.

The purpose of industrial development of the known belt wind-up rollers is the simplification of the construction thereof while maintaining the locking members acting as coupling members (also only a single locking member in some prior-art embodiments) as well as maintaining economical production of these coupling members. Heretofore, the coupling members have been held to be indispensible because, at the instant of the accident, a rotating member (winding roller) was to be locked or latched to the member (counter-support member) fixed to the housing. Therefore, complex functioning mechanisms were continually produced in all heretofore known belt wind-up rollers as a result of the complex coupling functions, the coupling members, moreover, having to be in a position to transfer the forces that occur.

It is accordingly an object of the invention to provide a belt wind-up roller for vehicle-safety belts with blocking device wherein the coupling member between the housing and the winding roller, and which transfers large blocking forces, is fully economized on or dispensed with.

Another object is to remove the load of the force-transfer between the axis of the belt wind-up roller and the housing, to arrange the locking part at the belt wind-up roller and the counter-locking part at the housing in such manner that the blocking is effected at the belt withdrawal side of the belt wind-up roller, in an angular zone β of approximately 120°, beginning approximately 10° from before the roll-off point of the belt, seen in the roll-off direction.

By this arrangement there is achieved in some special cases, that all forces occurring in blocking are absorbed by the locking and counterlocking members so that no side forces act on the axis roller of the belt wind-up which is displaced from its normal position against the spring forces, so that the axis floats, practically free, in the holding part. Another object of the invention is to provide a belt wind-up roller in which the above-mentioned effect is reliably realized over the total angular range. The invention starts from the recognition that, by a varied choice of the circumference of locking parts at the belt roller circumference and belt wind-up roller circumference, differences can exist which effect the position of the contact zone between the locking part and the counter-locking part.

The above-mentioned object i.e. to transfer the pulling forces without tilting side effects over the locking part and counter-locking part when blocking, and to relieve the load on the axis and the bearing of the belt wind-up roller, is achieved according to the instant invention by forming and arranging the locking part and counter-locking part so that, in the blocking state, the contact region between them is located at the belt withdrawal side of the belt wind-up roller in the zone of the tangent from the belt roll-off point, seen in the roll-off direction.

By this measure, one accomplishes that the force which is transferred by the belt which is to be withdrawn, which, in the locked state, can be of considerable magnitude, is fully absorbed by the locking part and counter-locking part, whereby no tilting or lever forces can occur because the force lies exactly in the direction of the belt-pull (tangent). Thus, the axis of the belt wind-up roller itself is relieved of all forces with the exception of small forces due to friction.

With the foregoing and other objects in view, there is provided, in accordance with the invention, that the blocking member is firmly connected to the winding roller and is movable with respect to the housing for blocking withdrawal of the belt. In a novel and surprising manner, the invention initially is an advancement over the prior art concept that the winding roller must be rotatably mounted in the housing fixed with respect to movement in radial direction. The concept of the radially rigid mounting is initially forsaken, in accordance with the invention, by disposing the winding axis of the winding roller so that it is movable with respect to the housing, preferably in a direction so that the winding roller assumes axially parallel positions, and/or the winding axis of the winding roller is disposed swivellably or displaceably at an angle with respect to the central housing axis. Various embodiments are presented whereby with the just-mentioned displaceability, it is preferably meant to shift the winding axis axially parallel to the housing, whereas in another embodiment, the combined axially parallel displacement and the angular swivel with respect to the axis, are provided.

In general, the advantage of the invention lies in that the belt wind-up roller of the invention is provided with only two structural components that can and must transmit the large forces and therefore are to be produced with a relatively greater material expenditure. In this regard, one of the structural components is the housing which is necessary for every belt wind-up roller and the other structural component is the winding roller with blocking or locking member which, likewise, is required for each belt wind-up roller.

A coupling member, such as a latch, movably mounted in the housing, a gear, a partial disc-like locking member or a locking member provided only partly with a toothed periphery, has become superfluous through the invention of the instant application.

It is possible to permit the belt wind-up roller according to the invention, to operate either in accordance with the principle of a friction lock or in accordance with the principle of a form lock. In the case of a friction lock or friction blocking, one of the two structural components, for example, the counter-support member can be constructed as a brake shoe which can act upon a friction surface provided at the periphery of the other, for example, circularly constructed counter-support member. In a particular embodiment, the blocking member is permitted to act through friction surfaces on the counter-support member constructed as a curved brake shoe or also as a circular ring. In another embodiment with friction lock, a construction can be provided wherein the counter-support member is formed as a circular ring having an inner ring groove, and the blocking member, concentrically and nearly immovable in axial direction, as a disc with a peripheral rib projecting outwardly therefrom and formed in a manner that the peripheral rib of the blocking member constructed as frictional surface, then acts against the inner opposing circular friction groove as, during an abrupt withdrawal of the belt web, the winding axis of the winding roller is swivelled out of the operating position axially parallel and/or angularly with respect to the axis and thereby brought into blocking position. The normal operating position is that position of the winding roller wherein the latter is disposed in the axis fixed with respect to the housing so that, when tightening or loosening the belt and also during slow movement of the belted occupant during slow withdrawal and winding-up of the belt, the winding roller can rotate without locking engagement.

The other possible principle of construction of the belt wind-up roller according to the invention is that operating with a form lock or blocking with a form lock. The blocking member can have, in this case, in a special embodiment, at least one locking stop, for example one or more teeth, form-lockingly engaging in correspondingly constructed one or more opposing teeth in a counter-support member fixed in the housing; and, in fact, also again in the case when, during a more forceful withdrawal of the belt, for example during an accident, the winding axis of the winding roller, due to the movable disposition thereof with respect to the housing, is shifted and/or swivelled out of the operating position.

In each case, with the novel belt wind-up roller according to the invention, the forces which occur are transformed at those locations at which strong structural parts are located, namely at the housing.

Heretofore known belt wind-up rollers are in fact already on the market wherein a gear acting as a locking member is firmly connected to the winding roller. In these heretofore known belt wind-up rollers, in the sense of the aforementioned constructions, the wind-up roller is however axially fixed but rotatably mounted in the housing, and an engaging latch movably disposed in the housing is provided as coupling member which, during an accident, for example, if the belt is abruptly withdrawn from the wind-up roller, ensures the form-locking connection between the winding roller, on the one hand, that is to be fixed and the counter-support member, on the other hand, that is fixed to the housing. In the invention, on the other hand, this complex functional mechanism of the coupling member transmitting large forces which must have good force transmission properties is avoided because, for the first time, a construction for a belt wind-up roller has been proposed which entirely omits the coupling member with the heretofore known constructions. In principle, this is achieved due to the fact that an equilibrium condition is produced, in the blocking engagement or contact, between the bracing moment in the counter-support member operating through friction lock or through form lock, on the one hand, and that moment, on the other hand, which is produced through the belt force during abrupt withdrawal of the belt.

Without limiting the invention to this explanation indicated theoretically and only broadly in principle, nevertheless it is plausible for an understanding of the invention that with the displaceable mounting of the winding axis of the winding roller, the tensile force in the belt itself ensures the displacement and/or swivelling of the winding axis and, accordingly, the blocking engagement. In accordance with another feature of the invention, holder means are fixed to the housing for mounting the winding roller under spring bias and fixed against movement in axial direction thereof. The counter-support member and/or the blocking member can thereby be formed so that they are narrow or thin in axial direction, so that the blocking position can be produced at any time, if the blocking and counter-support members are disposed concentrically to one another in a special embodiment and if, for example, the blocking member, as a relatively thin disc runs concentrically in the likewise relatively thinly constructed ring-shaped counter-support member. Due to the spring bias, the operating position is ensured in the unblocked condition and, depending upon the strength of the spring, the axially-parallel displacement or the swivelling of the winding roller obliquely to the axis is more-or-less readily permitted.

In accordance with a further feature of the invention the holder means form part of a cover for the housing, the cover part being formed with an elongated cutout and a control cam. The holder means acting as a bearing then permits a defined engagement or contact movement, for example, for the axially parallel shift of the winding roller, upon the occurrence of the tensile force. Furthermore, the prerequisites for a rapid attainment of the blocking position are thereby provided. This is, besides the safety, always a desired characteristic. In accordance with an added feature of the invention the blocking member is a locking member formed with at least one locking tooth and displaceably engaging formlockingly in the counter-support member fixed to the housing and having at least one inner tooth, the locking member being disposed on each end of the winding roller and being associated with a respective locking member in the counter-support member at the housing side, and the winding axis being displaceable axially parallel by blocking withdrawal of the belt.

The principle of the form-locking blocking promises, as a result of exhaustive tests, short response times and a readily controllable construction whereby one can establish a connection with the aforedescribed measures to the heretofore known constructions with which (of course, operating with completely different principles) the winding roller has a gear at both ends thereof. The functional kinematics are simplified in yet another embodiment of the invention wherein solely the axially parallel displaceability is provided, in addition to which the loads are uniform in the textile belt web. Good prerequisites therefor are the spring-biased bearings which are technically controlled.

In accordance with an additional feature of the invention, the counter-support member fixed at the housing has only one inner tooth with a positive flank angle. The term "positive flank angle" is explained more fully hereinbelow with respect to the drawings. This is an angle which is defined, on the one hand, by the radius extending through the front tooth foot and, on the other hand, through the front tooth flank. The "front" side of the tooth of the rotary locking member initially reaches locking contact or engagement.

The advantage in the use of only one tooth at the counter-support member fixed to the housing lies in the attainment of a defined contact or engagement position. What is especially ensured thereby is that the locking member is reliably wound in and a guarantee is provided of a complete contact or engagement. The toothing forces (tooth flank forces) automatically ensure the blocking or locking action because an automatic winding effect is provided thereby. The positive flank angle of this single tooth also affords the elimination entirely of the bearing forces for the winding roller in the condition of the locking engagement.

Further developments of the invention of the instant application have shown that it is especially advantageous, in accordance with yet another feature of the invention, when the locking member is disposed on one of the two ends of the winding roller and is associated with the counter support member at the housing side and the winding axis is displaceable axially parallel for blocking withdrawal of the belt. Although the winding roller is constructed asymmetrically, axially parallel displaceability is nevertheless assured, in accordance with yet a further feature of the invention wherein the winding roller is mounted under spring bias at both ends thereof. In accordance with another feature of the invention, the locking member is disposed on only one of the two ends of the winding roller and a spring biased bearing is provided at the one end of the winding roller, the other of the two ends of the winding roller being mounted with swivel play in an opposing bearing fixed in the housing. In this manner, by means of a swivelling motion through a slight angle, the possibility is provided for the locking member to engage in the counter-support member, while the bearing on the opposing side holds the winding roller with pivot play. Such a bearing is readily manufacturable from the engineering standpoint and will be explained in greater detail hereinafter in connection with the description of the figures.

Whereas, with the heretofore known belt wind-up roller, it is conventional that both the locking member as well as the counter-support member are provided with teeth completely around the entire periphery, it is also sufficient, in accordance with the invention, if the locking member only is connected as a type of gear and the counter-support member is provided with teeth only in a given region or is provided with only one tooth in this contact region, as mentioned hereinabove. In this regard, it is of interest to know in which region of the counter-support member, the tooth or the teeth are provided. It is especially preferable and in accordance with a concomitant feature of the invention, to provide the contact between the blocking member and the counter support member in the blocking portion within an angular range of about 120° about the rotatable shaft in a region of the wind-up roller wherein a partial belt length is being withdrawn tangentially from the winding of the belt on the roller, the angular range beginning substantially 10° below the point of tangency of the partial belt length to the belt winding on the roller and being measured in a mathematically positive sense. In the determination of the portion of the contact region only the counter-support member is of interest because the blocking member runs concentrically therein as a toothed disc. It thus depends upon the direction in which the tensile force of the belt withdrawn at high speed pulls the blocking member toward the counter-support member in order to reach the blocking condition. During this consideration, one always starts from the tangential location at which the belt partial length is being withdrawn from the belt winding on the roller. Viewed in direction of the belt withdrawal, this angle range begins about 10° below or clockwise of the belt withdrawal point of tangency and extends (measured in mathematically positive sense) for 120°; and preferably extends outwardly from the tangency point in an angle range of 90°. In a special embodiment of the invention, it has been found to be desirable if that angle range begins 10° above the point of tangency of the belt withdrawal and extends at most to a location of the radius disposed parallel to the direction in which the tensile force is applied to the belt.

Other features which are considered as characteristic for the invention are set forth in the appended claims.

Although the invention is illustrated and described herein as embodied in belt wind-up roller for vehicle-safety belts with blocking device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing in which.

Figure 8:
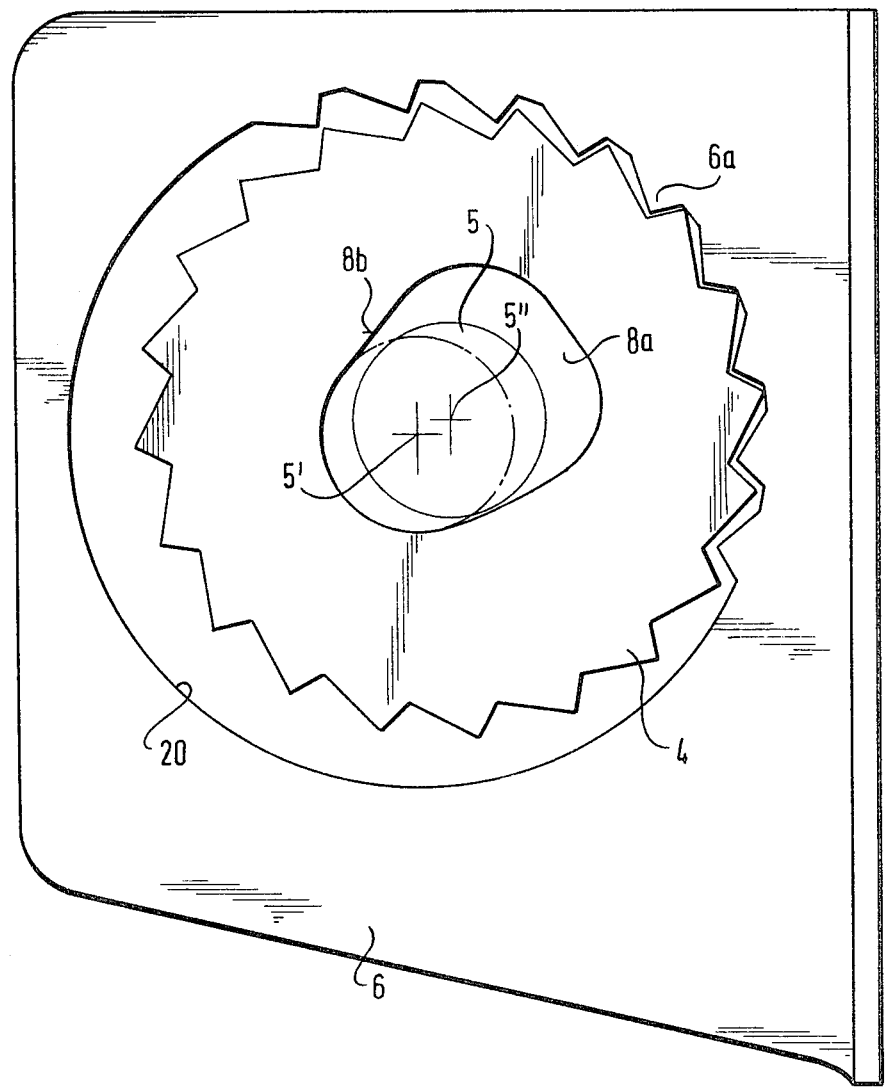
Figure 9:
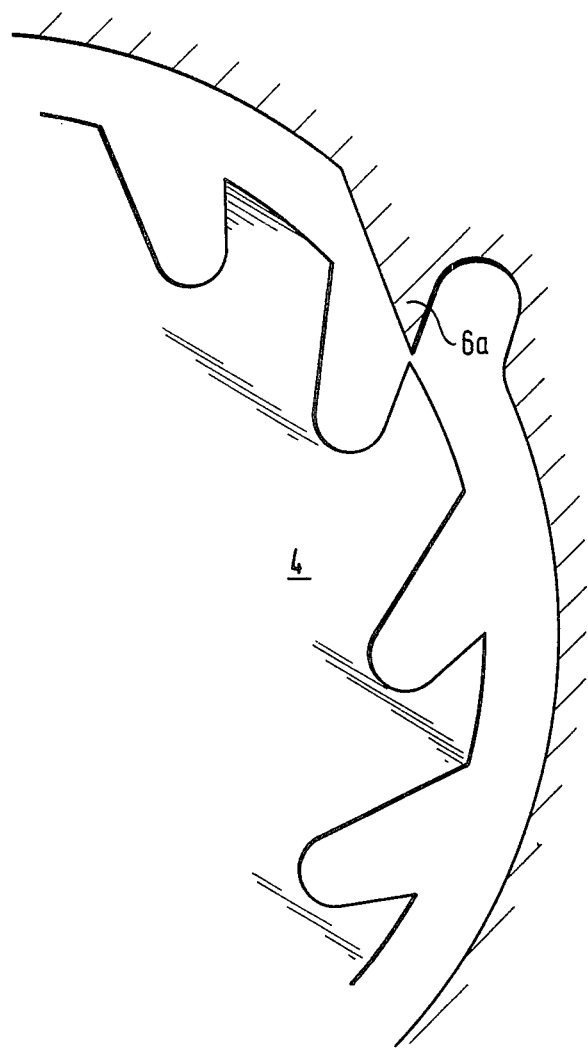

FIG. 8 is a diagrammatic view of a special toothing of yet a further embodiment of the invention wherein the blocking member is provided with teeth running around the periphery thereof, while the counter-support member is provided with corresponding opposing teeth only in the contact region and, in the middle, an elongated recess is formed with a control cam; and FIG. 9 is an enlarged fragment of a view similar to that of FIG. 8 of another type of toothing wherein the counter-support member is again provided with only one tooth in the contact region.

Figure 1:
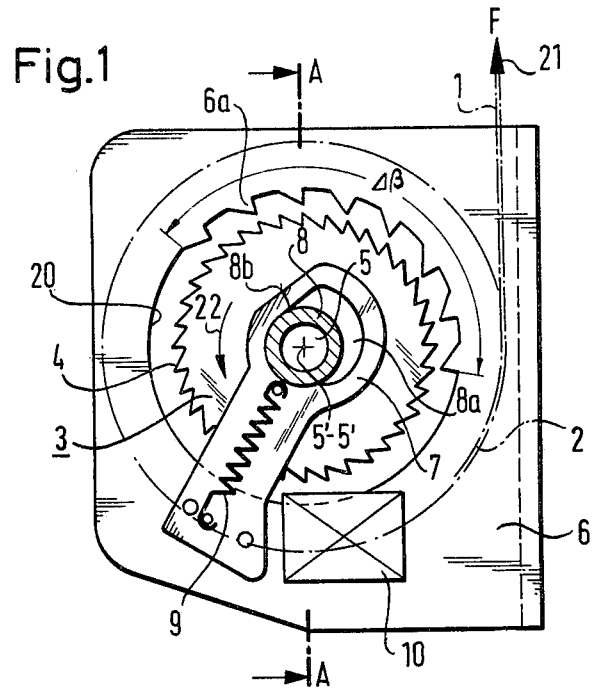
FIG. 1 is a sectional view of a first embodiment of a belt wind-up roller for vehicle safety belts according to the invention, taken through a journal thereof and having a winding roller thereof journalled at both sides thereof in a spring-loaded bearing.

Referring now to the drawing and first, particularly, to FIG. 1 thereof, there is shown a first embodiment of a belt wind-up roller according to the invention, of which only the most important parts necessary for understanding the invention are illustrated. Illustrated in FIG. 1 is an U-shaped housing 6, as seen from a side thereof, both legs of the U being formed with a large bore 20 concentric to an axis 5'—5' so that a winding roller 3 can run with a gear 4 on each side thereof acting as a locking member. The housing 6 provided with the bores 20 is formed with teeth 6a in the so-called contact region at the edge of the bores 20, the diameter of the gear 4 measured from the outer points of the teeth thereof being somewhat smaller than the inner diameter of the bore 20 as measured from the outer point of the teeth 6a of the housing 6 which acts as a counter-support member. In this manner, the gear 4, in the so-called operating position thereof wherein the axis 5'—5' thereof and accordingly also the axis of the winding roller 3 coincide with the axis of both bores 20, can rotate freely without disturbance in direction of the arrow 22, during withdrawal of the belt 1 in direction of the arrow 21 when unwinding the belt winding 2.

Figure 2:
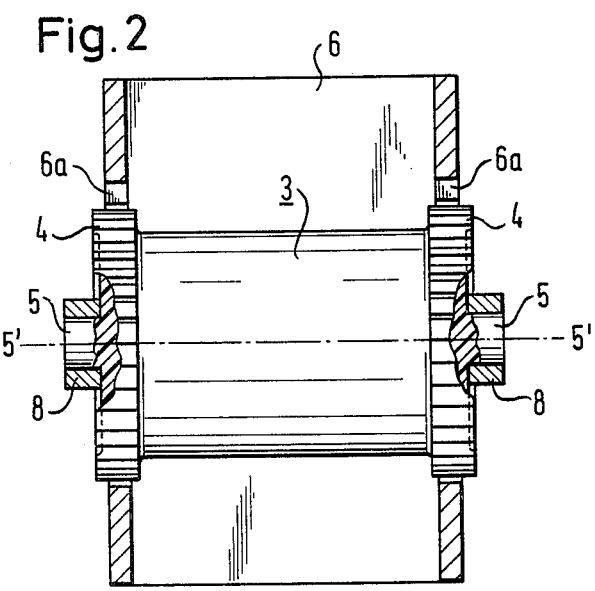
FIG. 2 is a sectional view of FIG. 1 taken along the line A—A in direction of the arrows with the lateral spring-loaded journal bearings thereof omitted.

Omitting several parts in FIG. 2, there is diagrammatically illustrated therein in which concentric position the gear 4 is located with respect to the bore or recess 20 or the teeth 6a. In the preferred embodiment shown in FIG. 2, the winding roller 3 and the gear 4 represent an unitary or integral member formed of plastic or synthetic material having two external journals 5 located on opposite sides thereof. Mounting of the winding roller 3 is effected by these journals 5, the front side of which is shown in FIG. 1. A support bearing 7 is threadedly secured on the outside of the housing 6 and, in the illustrated embodiment, is stamped out of sheetmetal.

Instead of this arm-shaped bearing 7, a disc or a surface member covering the entire wall of the housing 6 could be threadedly secured, riveted or welded thereto as well. It is also possible that this surface member may be formed by the cover of the housing 6 and constructed of synthetic material. A special embodiment of the invention is shown in FIG. 1 wherein the support bearing 7 is formed with a recess or cutout 8a having the shape of a bent ring. The cutout 8a, in the view of FIG. 1, is provided at the upper left-hand side thereof with a control cam 8b which serves for axially parallel displacement of the winding roller 3 in the defined contact movement. The journals 5 of the winding roller 3 extend not only through the large bore 20 but also through the cutout 8a of the support bearing 7 wherein it is supported by a respective bearing bushing 8.

The operating position of the belt wind-up roller illustrated in FIG. 1 is under normal conditions and not under accident conditions, so that the gear 4 is not in meshing engagement with the teeth 6a of the housing 6 serving as counter support member. By means of the tension spring 9, which is fastened at one end thereof to the ring-shaped bearing bushing 8 and at the opposite end thereof firmly to the housing 6 or to the support bearing 7, the respective journal 5 is drawn into the operating position shown in FIG. 1 e.g. to the lower left-hand side in the cutout 8a.

Not illustrated is a wind-up spring with the aid of which the belt 1 is wound on the winding roller 3 into a belt winding or coil 2. The gear 4 runs freely, in normal roll-up and unrolling operation, in the bore 20 of the housing 6 which either has the toothing 6a over the entire periphery or, as in the illustrated embodiment of FIG. 1, preferably, however, only in the upper region thereof.

Figure 3:
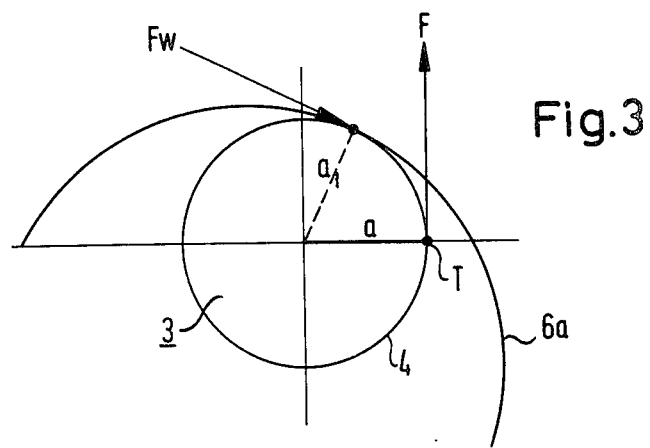
FIG. 3 is a diagrammatic sketch of active forces which illustrate the principle of operation of the belt wind-up roller according to FIGS. 1 and 2, reference being made especially to the view of the embodiment in FIG. 1.

Apparent from FIGS. 1 and 3 is the belt run-off point T at which the belt 1 runs out from the winding or coil 2 tangentially and substantially parallel to the base wall of the housing 6. It is evident from FIG. 1 that the non-identified angle range $\Delta\beta$ within which the contact region between blocking or locking member and opposing member or housing 6 is located, is an ample 120°, these 120° resulting from counting in mathematically positive sense, if the counting is commenced somewhat below the belt runoff point T.

The principle of the invention of the freely wobbling winding axis is explained with respect to FIG. 3 purely schematically and without any claim to completeness (especially not mathematical completeness). By applying an abrupt pull or tension with a force F, according to FIG. 3, to the belt 1, the spring-biased winding axis 5'—5' of the winding roller 3 with the gear 4 thereof (or with both gears to the right and left-hand sides thereof) is lifted out of the operating position thereof shown in FIG. 1, so that the gear 4 engages in the toothing 6a at the sides of the housing 6. The journals 5 thereby "wobble" virtually freely, only slightly guided by the cutout 8a, since no bracing or support is required. In order to maintain an acceleration of the displacement operation into the contact position i.e. in order to form the axially parallel movement of the winding roller 3 into a defined contact movement, the control cam 8b is provided which ensures that the bearing bushing 8 is guided somewhat below 45° to the belt withdrawal direction, also 30° or 60°, if necessary, so that the contact region comes to lie narrowly limited in the sector of the housing 6 and the toothing 6a located thereat, shown in the upper right-hand side of FIG. 1

With respect to FIG. 3, the principle to be explained is that between that moment which is produced with the lever arm a through the belt force F, and between the bracing or supporting movement through the tooth contact e.g. the force $F_w$ and the lever arm $a_1$, an equilibrium condition is set by itself in the housing bore 20 provided with the teeth 6a. In this consideration, friction and other very minor factors are ignored, however, it is clear, in principle, how the gear 4 with the winding roller 3 is pulled into the contact region and, consequently, into blocking or locking condition, due to the abrupt yank of the belt upwardly to the right-hand side, as viewed in FIG. 3. A sensor 10 is shown diagrammatically in FIG. 1, it being responsive to vehicle acceleration and, after a set acceleration value is exceeded, a non-illustrated pawl engages in the space between the teeth of the gear 4. This engagement also results in a lifting of the winding roller 3 against the force of the springs 9, the sensor pawl being expediently constructed so narrow that it disengages from the gear 4 at the instant the gear 4 begins to mesh with toothing 6a of the housing 6. In an advantageous manner, the sensor unit 10 is only very slightly stressed or subjected to loading thereby, which is of great importance for the durability thereof.

Figure 4:
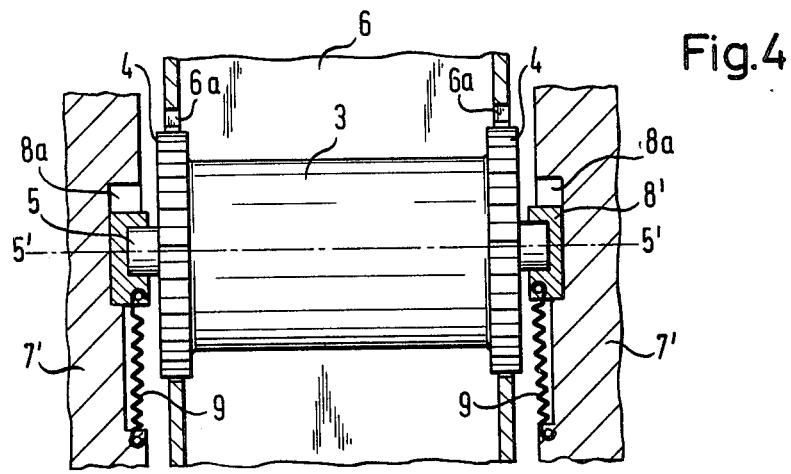
FIG. 4 is a sectional view similar to that of FIG. 2 of another embodiment of the belt wind-up roller having, on both sides thereof, a blocking member running in a counter-support member and provided, on both sides thereof, with a spring-loaded bearing.

In FIG. 4, another embodiment of a belt wind-up roller according to the invention is shown wherein the winding roller 3 has, at both sides thereof, respectively, a gear 4 with an outwardly projecting journal 5. The gears 4 and respective journals 5 are mounted through cap bushings 8' in two covers 7', shown fragmentarily in FIG. 4, which serve as support bearings. The cap bushings 8' are mounted with spring-bias provided by respective tension springs 9 in the cutout 8a on each side of the covers 7' and can move within the respective cutout 8a. In this manner, axial non-displaceability is assured, and the winding roller 3 can shift or move to positions quite exactly parallel to the axis 5'—5'.

Figure 5:
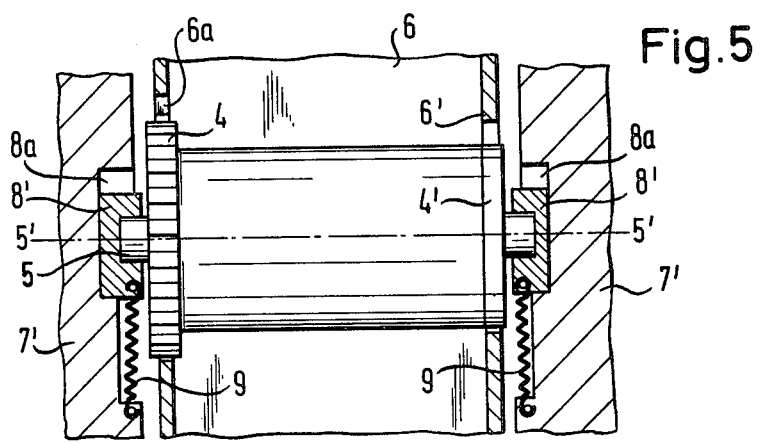
FIG. 5 is a sectional view similar to that of FIG. 4 of another embodiment of the invention wherein, however, only one gear is shown at the left-hand side thereof, and wherein a respective spring-loaded bearing is provided at both sides thereof.
Figure 6:
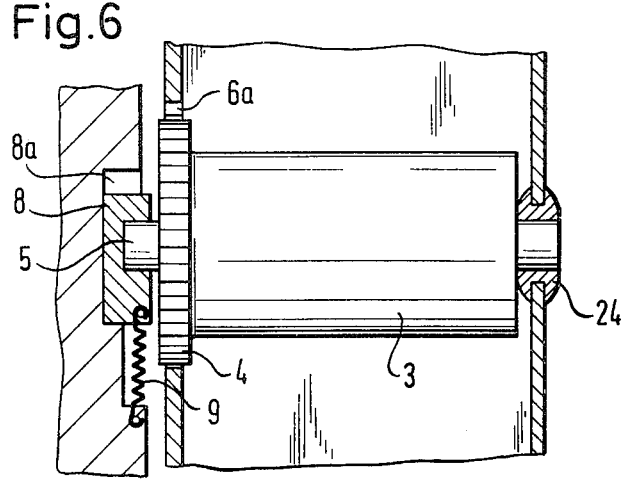
FIG. 6 is a sectional view similar to that of FIG. 5 of yet another embodiment of the belt wind-up roller, according to the invention, having also, at the left-hand side thereof, only one gear acting as a blocking member, and having, at the opposite side thereof, a fixed bearing which affords swiveling.

In FIG. 5, such mobility to axially parallel positions is likewise afforded by the identical bearings at the right and the left hand sides, the gear 4 at the right-hand side of FIG. 4 being replaced, however, by a simple disc 4' in FIG. 5. It is apparent that the disc 4' has been reduced to a diameter which corresponds somewhat to that of the winding roller 3, and that the radial spacing or clearance to the outer surrounding housing part 6' along the periphery corresponds somewhat to that of the lift play. Also, in this embodiment of FIG. 5, the belt 1 can cause a shift or displacement of the winding roller 3 to position parallel to the axis 5'—5' in a manner that, in view of FIG. 5, on the left-hand side thereof, the gear 4 and the toothing 6a fixed to the housing 6 arrive at blocking or locking condition in the mutual contact region thereof, whereas at the opposite side, the toothless disc 4' then lies upon the housing part 6'. FIG. 6 shows an embodiment of the invention similar to that shown in FIG. 5, namely with only one gear 4, but with a swivel bearing 24, however. It is possible thereby for the journal 5 of the winding roller 3, shown at the left-hand side of FIG. 6, to move upwardly along the cutout 8a opposite to the tensioning effect of the spring 9, whereas the swivel bearing 24 permits a swing slightly angular to the winding axis 5'—5'. Tests have shown that for such a slight deflection (presupposed through the corresponding shape of the teeth) the loading or stress in the belt subjected to tension can equalize well, so that, in the event of an accident, damage or belt rupture or tearing is not feared.

Instead of the rigid cap bushings or rings 8 mounted with the springs 9, and which are movably disposed in the cutout 8a of the support bearing 7, holders formed of elastic material, such as rubber or, if necessary, also deformable synthetic material, may also be used.

Figure 7:
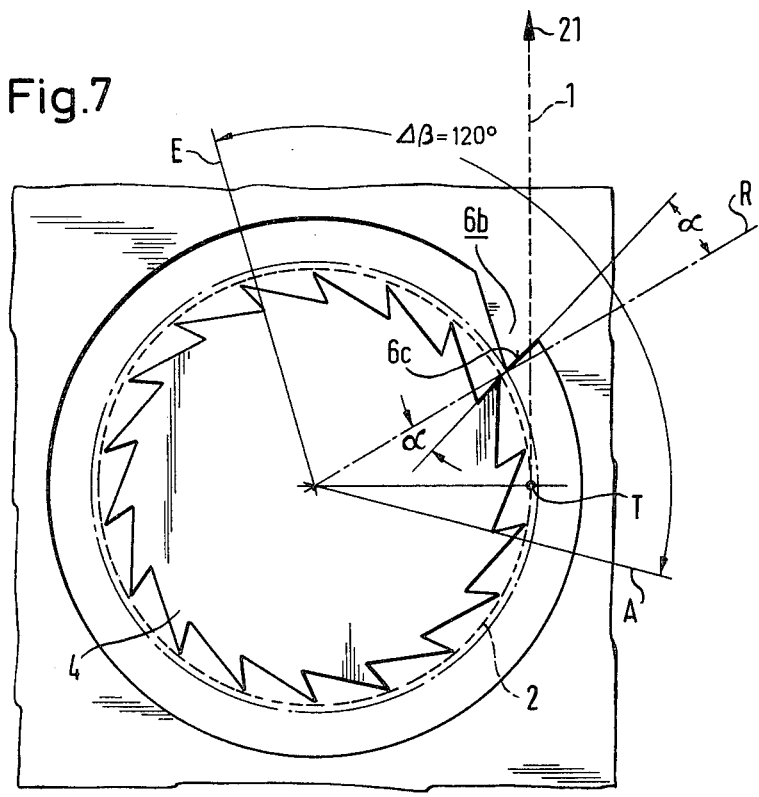
FIG. 7 is a diagrammatic view of the angular range in which the contact region is found, only a single tooth located at the counter-support member being diagrammatically illustrated therein.

FIG. 7 shows diagrammatically and schematically the angle range $\Delta\beta=120°$ for the contact region wherein several teeth or, as in the embodiment illustrated in FIG. 7, a single tooth 6b of the housing is located. The radius R shown as a dot-dash line extends through the head of the tooth 6b. If the hereinabovedefined forward tooth flank 6c is then extended or lengthened in both directions in FIG. 7 i.e. both to the left and the right-hand sides, the resulting line intersects with the dot-dash line representing the radius R to define the positive flank angle $\alpha$ therebetween.

In FIG. 7, furthermore, the belt run-off point T is shown from which the belt length or web 1 is unwound in direction of the arrow 21 from the belt winding or coil 2 otherwise non-illustrated in FIG. 7. Going back clockwise about 10° from the belt run-off point T on the right-hand side of FIG. 7, there is a starting line A from which the angle range $\Delta\beta$ for the hereinabovedescribed contact region between the blocking or locking member 4 and the counter-support member 6 extends to an end line E. Beginning from the starting line A, in another embodiment of the invention, the angle range $\Delta\beta$ for the contact region can also extend from about 20° to 100°, whereby there would also be provided from one to three teeth 6a of the housing 6 in an angle of about 45° in the sector of the circle at the upper right-hand side of FIG. 7.

FIG. 8 shows the housing 6, the teeth disposed on the outside around the periphery of the gear 4 serving as the blocking or locking member, and the teeth 6a at the housing 6 provided only in the contact region. In addition, the position of the cutout 8a is shown, in the upper left-hand side of which, as shown in FIG. 8, the control cam 8b is indicated piecewise as a straight line inclined at somewhat less than 45° to the vertical. In the sector of the circle at the upper right-hand side of FIG. 8, the cutout 8a has substantially the curvature of the journal 5 or the bearing ring therefor and, in the part at the lower right-hand side of FIG. 8, the cutout 8a bulges out to ensure as much as possible, a contact-free position for the journal 5, in the case of the blocking or locking engagement. The operating position of the journal 5 is indicated in FIG. 8 in phantom by a circle with the winding axis 5'. After the operation wherein the teeth of the gear 4 engage in the toothing 6a fixed to the housing 6, the journal 5 has moved into the position thereof shown in phantom by a circle with the winding axis 5". The reaction-free bearing in the blocking or locking condition is apparent.

FIG. 9 shows purely diagrammatically a typical different toothing of the gear 4 in a partly broken-away and fragmentary view with a single tooth 6a fixed to the housing 6, the wall of the housing being merely indicated without identification.

FIGS. 7 and 9 show sections of a belt wind-up device with the starting point where belt 1 is to be pulled upward from wind-up roller 3.

The belt wind-up roller is slidably supported in a known manner on an axis, not shown, against the force of springs, not shown.

A locking part 4 in the form of a toothed ring or member is secured at the side of the belt wind-up roller 3, preferably on both sides. As a counter-locking part, a tooth 6b is arranged at the housing 6 with a corresponding recess.

As is clearly shown in FIG. 7, the tooth 6b which serves as counter-locking part lies exactly in the roll-off direction 21 of the belt 1, which coincides with the tangent from the roll-off point of the belt looking in the roll-off direction.

It can be seen that the whole force on belt 1 is absorbed or taken up by the frontal face of the corresponding tooth of the locking part 4 on the wind-up roller 3, and the frontal face 6c of tooth 6b on the housing.

In order to make it possible to transfer the force over the whole surface and to achieve a perfect engagement, the forward tooth flank 6c is inclined by positive angle $\alpha$ with respect to the radius R which runs from the center of the wind-up roller through the tip of the tooth 6b. As already explained, by virtue of this measure, even at the strongest pull on the belt 1 in the direction of arrow 21, no tilt-forces act on the roller, so that the axis of the wind-up roller 3 can float freely in space without restraint, and is not exposed to any side-forces.

FIG. 9 shows an advantageous embodiment of a partial section of the tooth arrangement of the toothed ring 4 of the belt wind-up roller 3 which functions as locking member in conjunction with the counter-locking part in form of a single tooth 6a that is disposed at the side of the housing.

There are claimed:

1. Belt wind-up roller for vehicle safety belts having a wind-up roller in a housing for winding up a withdrawable belt that is supported on a rotatable shaft, blocking means for blocking rotation of the rotatable shaft with a sudden acceleration of the belt-withdrawal, to prevent a further withdrawal-or-pulling out of the belt, said blocking being effected by means of at least one blocking member which is supported on the axis of the belt wind-up roller which latter is slidably arranged in the housing, a spring exerting a force retaining the wind-up roller in position so that at a sudden acceleration of the belt pull, the axis of the wind-up roller is, at least on one side, displaced in a direction transverse to the roller axis against the force of the spring, a counter-locking part, said blocking member having at least one locking part which comes into engagement in the blocked state with the counterlocking part in the form of a tooth with a tooth flank disposed on the housing in an angular range of approximately 120°; beginning approximately 10° before the roll-off point of the belt, in the roll-off direction of the belt, said counterlocking part constructed with a contact surface on the tooth flank which, when engaged by said locking part, forms a contact region between the two, said contact surface being disposed at the withdrawal side of the wind-up roller such that a plane parallel to the axis of the belt wind-up roller and which has a tangent from the roll-off point of the belt locking in the roll-off direction of the belt intersects said contact surface of the tooth flank thereby causing the force on the belt resulting from said belt pull to be absorbed by the counterlocking part and locking part.

2. Belt wind-up roller according to claim 1 wherein the blocking member at the wind-up roller is constructed as a toothed member and the counter locking part consists of a single tooth disposed on the housing.

3. Belt wind-up roller according to claim 2 wherein said single tooth is disposed at the side of the housing and the tooth flank is inclined by a positive flank-angle with respect to the radius which runs from the center of the wind-up roller through the tip of the tooth.

4. Belt wind-up roller according to claim 1 or claim 2, or claim 3, wherein the slidably supported axis of the wind-up roller is guided in an elongated cut-out along a cam surface which is provided in the cover of the housing.

5. Belt wind-up roller for vehicle-safety belts having
 (a) a U-shaped housing
 (b) with both legs of the U formed with a large bore concentric to an axis about which a winding roller normally rotates, said large bore having at least one inner tooth serving as a counter support member
 (c) the winding roller for winding a withdrawable belt thereon normally rotatable about said axis but capable of radial movement relative to the housing
 (d) a blocking member with at least one locking tooth rigidly affixed to at least one end of the winding roller and positioned in the large bore, said blocking member being of smaller dimension than the large bore to permit free rotation of the blocking member therein but sufficiently large for the locking tooth to be adjacent the inner tooth for locking engagement by applying an abrupt pull or tension to the belt causing the winding roller with its affixed blocking member to move radially and the locking tooth of the blocking member and the inner tooth of the counter-support member in locking engagement, and
 (e) holder means fixed to the housing for mounting the winding roller under spring bias and said holder means fixed against movement in axial direction, wherein said holder means form part of a cover for the housing, said part being formed with an elongated cutout on which the roller is supported and a control cam which serves for axial displacement of the winding roller in the movement due to an abrupt pull of the belt, and wherein said blocking member is disposed on one of the two ends of the winding roller, and a spring-biased bearing is provided at said one end of the winding roller, the other of the two ends of the winding roller being mounted with swivel play in an opposing bearing fixed in the housing.

* * * * *